UNITED STATES PATENT OFFICE.

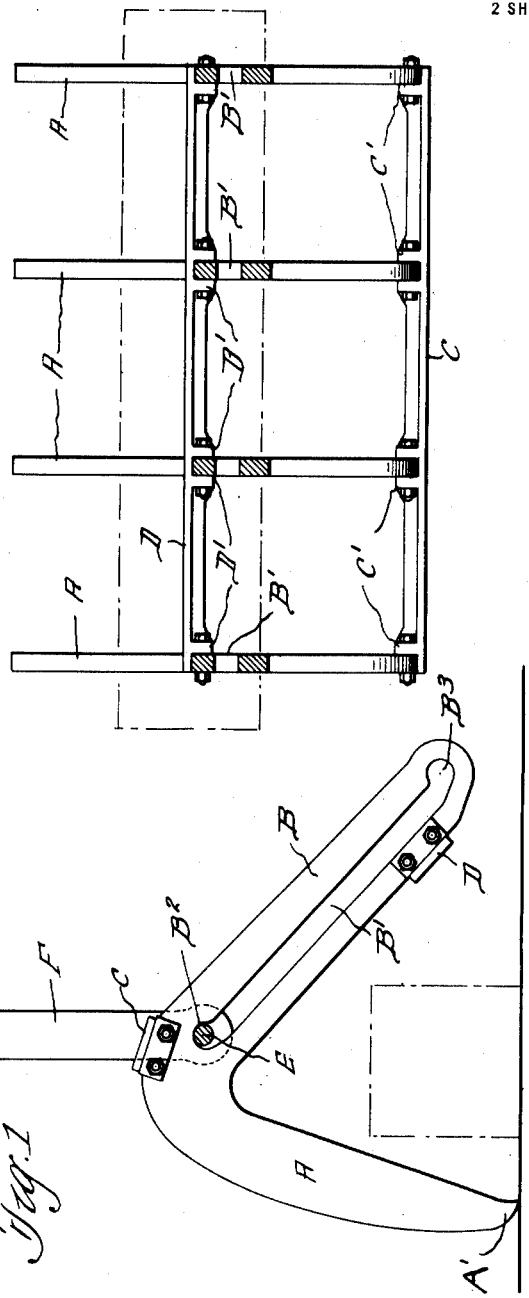
F. H. SMITH.
SELF DUMPING BAR CARRIER.
APPLICATION FILED SEPT. 18, 1920.
1,390,650.
Patented Sept. 13, 1921.
2 SHEETS—SHEET 1.
Inventor
F. H. Smith

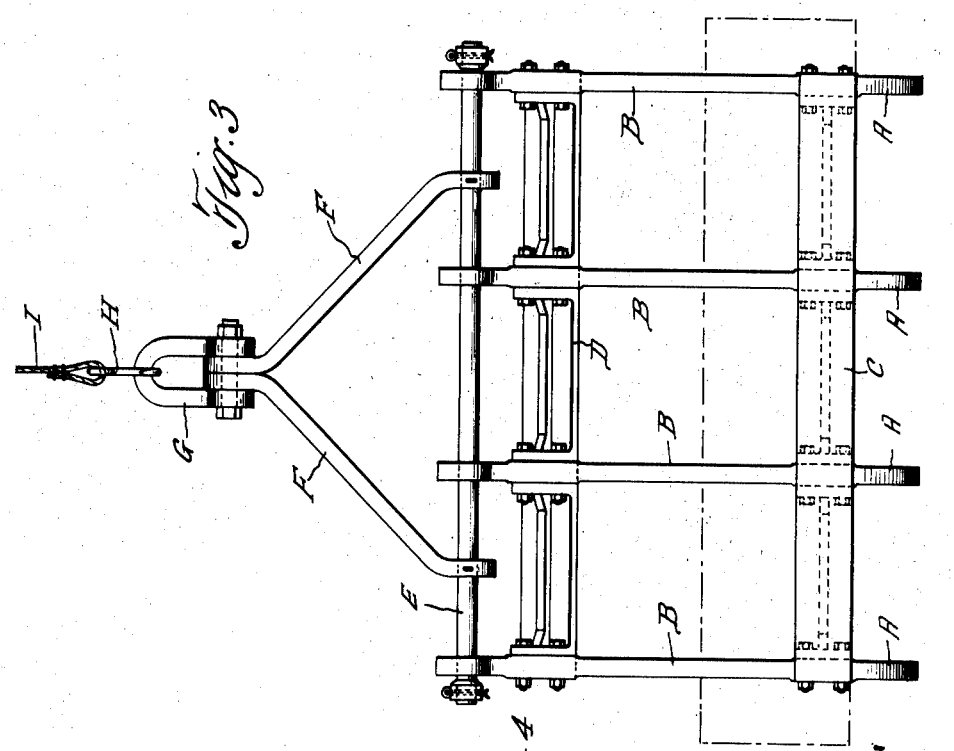
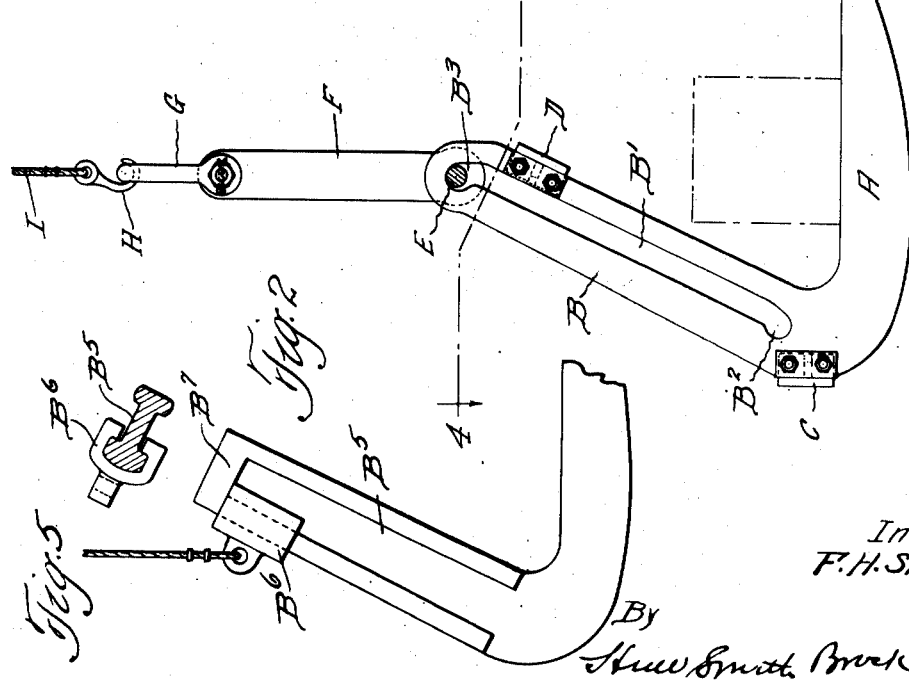

FRANK H. SMITH, OF CANTON, OHIO.

SELF-DUMPING BAR-CARRIER.

1,390,650.  Specification of Letters Patent.  Patented Sept. 13, 1921.

Application filed September 18, 1920. Serial No. 411,249.

*To all whom it may concern:*

Be it known that I, FRANK H. SMITH, a citizen of the United States, residing at Canton, in the county of Stark and State of Ohio, have invented a certain new and useful Improvement in Self-Dumping Bar-Carriers, of which the following is a full, clear, and exact description, reference being had to the accompanying drawings.

This invention relates generally to a carrier for bars, billets, and the like and more particularly to a self dumping or discharging carrier, the object being to provide a strong and durable carrier, simple in construction which will receive and carry bars and billets as usual, and which can be dumped or discharged by simply lowering the carrier and its load until it rests upon the ground, slackening the lifting cable slightly and then pulling up on the cable, the upward pull serving to turn the carrier over and dump the same.

The invention consists in the novel features of construction and in the manner of combining or arranging them, all of which will be fully described hereinafter and set forth in the appended claims.

In the diagrams forming a part of this specification, Figure 1 is a side elevation of a carrier constructed in accordance with my invention. Fig. 2 is a front view of the same, Fig. 3 is a side view showing the dumping operation, and Fig. 4 is a sectional plan on the line 4—4 of Fig. 1.

Fig. 5 shows a slight modification.

In the practical embodiment of my invention, I employ at least a pair of hooks, (but preferably four) each hook comprising a horizontal or carrying member, A and an upright member B, the upright member being slightly inclined as shown so as to place its upper end over the lower member A.

Each upright member B has a longitudinal slot B' produced therein, and the lower end of each slot is slightly enlarged or transversely offset as shown at B² and these slots may also be offset at their upper ends as shown at B³ but this is not absolutely necessary.

Each arm A has its bottom curved or shaped like a rocker as shown at A' so that the carrier can be easily rocked and dumped as hereafter explained.

The hooks are arranged in parallel relation and connected together to provide a frame, and this connection is preferably made in the form of two braces, C and D, connected respectively to the exterior angles of the hooks, and the inner sides of the uprights near their upper ends.

Any suitable form of brace or connection can be employed, but in practice I prefer to employ a combined brace and spacer, and with this idea in view make each brace long enough to connect with all the hooks and provide spacing and attaching lugs C' and D' between which the hooks are positioned and to which they are attached by bolts or rivets or otherwise.

A horizontal shaft E is passed through the slotted upright members of the hooks and provided with any suitable means at each end to prevent dislocation.

Links F are connected to the shaft E preferably intermediate its ends, said links converging upwardly, their upper ends being connected to and by a clevis G which in turn is engaged by a hook H, carried at the end of the lifting cable I.

In operation, the load is placed on the horizontal arms A of the hooks, and the frame as a whole moved by the cable to point of dumping. The frame is then lowered until the hooks rest upon the ground, and as the cable slackens, the shaft E will move down the slots B' and rest in the offset B². Then as the cable is moved up slightly the frame as a whole is rocked and turned over and dumped as shown in Fig. 3 and after the load has been dumped the cable is lowered so that the shaft or bar E will travel down the slot B' until it reaches the offset B³ and then by pulling upwardly upon the cable the frame will be turned back to the position shown in Fig. 1, and as it is lifted clear of the ground, having discharged its load. It is then ready to receive and carry another load, which will be discharged or dumped in the manner above described.

In the construction shown in Fig. 5 I have shown a slight modification in which the upright member B⁵ is made substantially I shape in cross section instead of being slotted, and sliding upon said member is a gripping shoe B⁶ to which a cable or clevis arm may be connected, and the upper end of the upright member is formed with stop lugs B⁷ against which the shoe contacts during the lifting operation.

In dumping, the cable is lowered so as to let the shoe slide down and then upon an upward pull the shoe will bite into ribbed member and tilt the same, and then by letting the shoe slide back again while the member B⁵ is tilted, it is caused to grip the upper portion and turn the carrier back to its receiving position.

It will thus be seen that I provide a simple and durable form of self dumping, bar or billet carrier.

Having thus described my invention, what I claim is:—

1. A frame comprising horizontal members and inclined upright members, said upright members being longitudinally slotted, the lower sides of said slots being transversely offset, a shaft movable in said slotted members, and centrally directed lifting means connected to said shaft.

2. A frame composed of horizontal members and upright members, the upright members being slotted longitudinally each slot being offset at the lower end and a lifting shaft arranged in said slottted uprights and provided with lifting means.

3. In a device of the kind described, the combination with a hook having its upright member longitudinally slotted, the lower end of said slot being transversely offset, a lifting member passing through said slotted upright member and movable in said slot and means connected to said lifting member to raise and lower the same.

4. A carrier comprising a plurality of hooks, secured in parallel relation, the upright arm of each hook being slotted longitudinally, each slot being enlarged at its lower end, a shaft movable in said slotted arms, and lifting means connected to said shaft.

5. A frame comprising a plurality of hooks, the upright members of which are slotted, braces connecting said hooks, a shaft extending through said hooks and movable in the slotted members thereof, links connected to said shaft and a clevis connected to the contiguous ends of said links.

6. A carrier comprising a plurality of hooks, the upright arm of each hook being slotted longitudinally, each slot being enlarged at its lower end, braces connected to said hooks, a shaft movable in the slotted members of the hooks, links connected to said shaft, and a clevis connected to the upper ends of said links.

7. A frame comprising a plurality of hooks, the upright members of which are slotted longitudinally the lower end of each slot being enlarged, braces having spaced bosses between which the hooks are secured, a transverse shaft passing through the slotted members of the hooks, links connected to said shaft, and a clevis connected to the upper ends of said links.

8. A device of the kind described comprising a plurality of hooks arranged in spaced relation and connected together, each hook having a horizontal arm the bottom of which is curved, and an upright arm longitudinally slotted, the lower end of said slot being enlarged, a shaft movable in said slotted arms, and lifting means connected to said shaft.

9. A device of the kind described comprising a plurality of hooks, connected together in parallel spaced relation, each hook having a horizontal arm, the bottom of which is curved, and an inclined upright arm, longitudinally slotted, the lower end of said slot being offset, the upper end of said upright arm being above the main portion of the horizontal arm.

10. A carrier comprising a plurality of hooks, secured in parallel relation, a cable for lifting said frame, and means connected with said cable, and movable upon the upright member of said hooks said means being capable of engaging the lower portion of said upright member to dump the frame.

11. A device of the kind described comprising a plurality of hooks, connected together in parallel relation, each hook having a horizontal arm, and an inclined upright arm, and means movable upon at least a pair of said upright arms, and adapted to engage said upright arms at either end thereof.

In testimony whereof, I hereunto affix my signature.

FRANK H. SMITH.